United States Patent
Gao et al.

(10) Patent No.: US 9,008,179 B2
(45) Date of Patent: Apr. 14, 2015

(54) ENCODING OF PREDICTION RESIDUALS FOR LOSSLESS VIDEO CODING

(75) Inventors: Wen Gao, West Windsor, NJ (US); Gregory Cook, San Jose, CA (US); Mingyuan Yang, Shenzhen (CN); Jin Song, Shenzhen (CN); Haoping Yu, Carmel, IN (US)

(73) Assignee: Futurewei Technologies, Inc., Plano, TX (US)

( * ) Notice: Subject to any disclaimer, the term of this patent is extended or adjusted under 35 U.S.C. 154(b) by 412 days.

(21) Appl. No.: 13/539,196

(22) Filed: Jun. 29, 2012

(65) Prior Publication Data

US 2013/0003840 A1     Jan. 3, 2013

Related U.S. Application Data

(60) Provisional application No. 61/503,534, filed on Jun. 30, 2011, provisional application No. 61/506,958, filed on Jul. 12, 2011.

(51) Int. Cl.

| | |
|---|---|
| *H04N 19/50* | (2014.01) |
| *H04N 19/13* | (2014.01) |
| *H04N 19/176* | (2014.01) |
| *G06T 9/00* | (2006.01) |
| *H04N 19/146* | (2014.01) |
| *H04N 19/46* | (2014.01) |
| *H04N 19/129* | (2014.01) |
| *H04N 19/61* | (2014.01) |
| *H04N 19/593* | (2014.01) |
| *H04N 19/132* | (2014.01) |
| *H04N 19/136* | (2014.01) |

(52) U.S. Cl.
CPC ............ *H04N 19/146* (2014.11); *H04N 19/50* (2014.11); *H04N 19/176* (2014.11); *H04N 19/46* (2014.11); *H04N 19/129* (2014.11); *H04N 19/61* (2014.11); *H04N 19/593* (2014.11); *H04N 19/132* (2014.11); *H04N 19/136* (2014.11)

(58) Field of Classification Search
None
See application file for complete search history.

(56) References Cited

U.S. PATENT DOCUMENTS

| | | | |
|---|---|---|---|
| 2009/0196348 A1* | 8/2009 | Masterson et al. | 375/240.03 |
| 2010/0124284 A1* | 5/2010 | Lee et al. | 375/240.18 |
| 2012/0163455 A1* | 6/2012 | Zheng et al. | 375/240.13 |

OTHER PUBLICATIONS

Wiegand, Thomas and Gary Sullivan, "The H.264/AVC Video Coding Standard", IEEE Signal Processing Magazine, Mar. 2007.*

Marpe, D., H. Schwarz, and T. Wiegand, "Context-Based Adaptive Binary Arithmetic Coding in the H.264/AVC Video Compression Standard", IEEE Transactions on Circuits and Systems for Video Technology, vol. 13, No. 7, Jul. 2003.*

(Continued)

*Primary Examiner* — William C Vaughn, Jr.
*Assistant Examiner* — Lindsay Uhl
(74) *Attorney, Agent, or Firm* — Conley Rose, P.C.; Grant Rodolph; William H. Dietrich

(57) ABSTRACT

An apparatus used in video encoding comprising a processor configured to generate a prediction block for a current block, compute a difference between the current block and the prediction block to generate a residual block, wherein the residual block comprises a plurality of residual values, and if the plurality of residual values include at least one non-zero residual value comprising at least one sign and at least one residual level, perform entropy encoding on the at least one sign; and perform entropy encoding on the at least one residual level, wherein one non-residual value comprises one sign and one residual level.

31 Claims, 6 Drawing Sheets

(56) References Cited

OTHER PUBLICATIONS

Nguyen, T., M. Winken, D. Marpe, H. Schwarz, and T. Wiegand, "Reduced-complexity entropy coding of transform coefficient levels using a combination of VLC and Pipe", Document No. JCTVC-D336, Joint Collaborative Team on Video Coding (JCTVC) of ITU-T SG16 WP3 and ISO/IEC JTC1/SC29/WG11, 4th Meeting: Daegu, KR, Jan. 2011.*

Sullivan, Gary and Thomas Wiegand, "Rate-Distortion Optimization for Video Compression", IEEE Signal Processing Magazine, Nov. 1998.*

"Series H: Audiovisual and Multimedia Systems, Infrastructure of Audiovisual Services—Coding of Moving Video, Advanced Video Coding for Generic Audiovisual Services," ITU-T H.264, Nov. 2007, 564 pages.

Nguyen, T., et al., "Reduced-Complexity Entropy Coding of Transform Coefficient Levels Using a Combination of VLC and Pipe," Joint Collaborative Team on Video Coding (JCT-VC) of ITU-T SG16 WP3 and ISO/IEC JTC1/SC29/WG11, JCTVC-D336, 4th Meeting Daegu, Korea, Jan. 20-28, 2011, 8 pages.

Fan, X, et al., "A Novel Coefficient Scanning Scheme for Directional Spatial Prediction-Based Image Compression," Proceedings of the 2003 International Conference on Multimedia and Expo, Jul. 2003, pp. 557-560.

Lee, Y, et al., "Improved Lossless Intra Coding for H.264/MPEG-4 AVC," IEEE Transactions on Image Processing, vol. 15, No. 9, Sep. 2006, 2610-2615 pages.

Murakami, T., et al., "Adaptive Picture Flipping Coding for Enhancing H.264/AVC," Picture Coding Symposium, Nov. 7, 2007, 4 pages.

Sullivan, G., et al., "The H.264/AVC Advanced Video Coding Standard: Overview and Introduction to the Fidelity Range Extensions," Proceedings of SPIE, The International Society for Optical Engineering, Applications of Digital Image Processing XXVII, 2004, pp. 454-474.

Yu, H., et al., "Joint 4:4:4 Video model (JFVM)," MPEG Meeting ISO/IEC/JTC1/SC29/WG11, Dec. 5, 2012, 12 pages.

Zhou, M., "AHG22: Sample-Based Angular Prediction (SAP) for HEVC Lossless Coding," JCTVC-G093, JCTVC ISO/IEC JTC1/SC29/WG11, Nov. 9, 2011, 12 pages.

Foreign Communication From a Related Counterpart Application, PCT Application PCT/US2012/045128, International Search Report dated Nov. 23, 2012, 5 pages.

Foreign Communication From a Related Counterpart Application, PCT Application PCT/US2012/045128, Written Opinion dated Nov. 23, 2012, 10 pages.

* cited by examiner

ENCODING OF PREDICTION RESIDUALS FOR LOSSLESS VIDEO CODING

CROSS-REFERENCE TO RELATED APPLICATIONS

The present application claims priority to U.S. Provisional Patent Application No. 61/503,534 filed Jun. 30, 2011 by Wen Gao et al. and entitled "Lossless Coding Tools for Compound Video", and U.S. Provisional Patent Application No. 61/506,958 filed Jul. 12, 2011 by Wen Gao et al. and entitled "Additional Lossless Coding Tools for Compound Video", each of which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed prior to being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. Due to limited network resources, improved compression and decompression techniques that increase compression ratios without substantially reducing image quality are desirable.

SUMMARY

In one embodiment, the disclosure includes an apparatus used in video encoding comprising a processor configured to generate a prediction block for a current block, compute a difference between the current block and the prediction block to generate a residual block, wherein the residual block comprises a plurality of residual values, and if the plurality of residual values include at least one non-zero residual value comprising at least one sign and at least one residual level, perform entropy encoding on the at least one sign; and perform entropy encoding on the at least one residual level, wherein one non-zero residual value comprises one sign and one residual level.

In another embodiment, the disclosure includes a method used in video encoding comprising generating a prediction block for a current block, computing a difference between the current block and the prediction block to generate a residual block, wherein the residual block comprises a plurality of residual values, and if the plurality of residual values include at least one non-zero residual value comprising at least one sign and at least one residual level, performing entropy encoding on the at least one sign, and performing entropy encoding on the at least one residual level, wherein one non-zero residual value comprises one sign and one residual level.

In yet another embodiment, the disclosure includes an apparatus used in video decoding comprising a processor configured to receive a bitstream comprising a plurality of encoded residual blocks and a plurality of encoded level inversion flags, wherein each encoded level inversion flag corresponds to an encoded residual block, perform entropy decoding on the plurality of encoded residual blocks to generate a plurality of decoded residual blocks, and perform entropy decoding on the plurality of encoded level inversion flags to generate a plurality of decoded level inversion flags.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
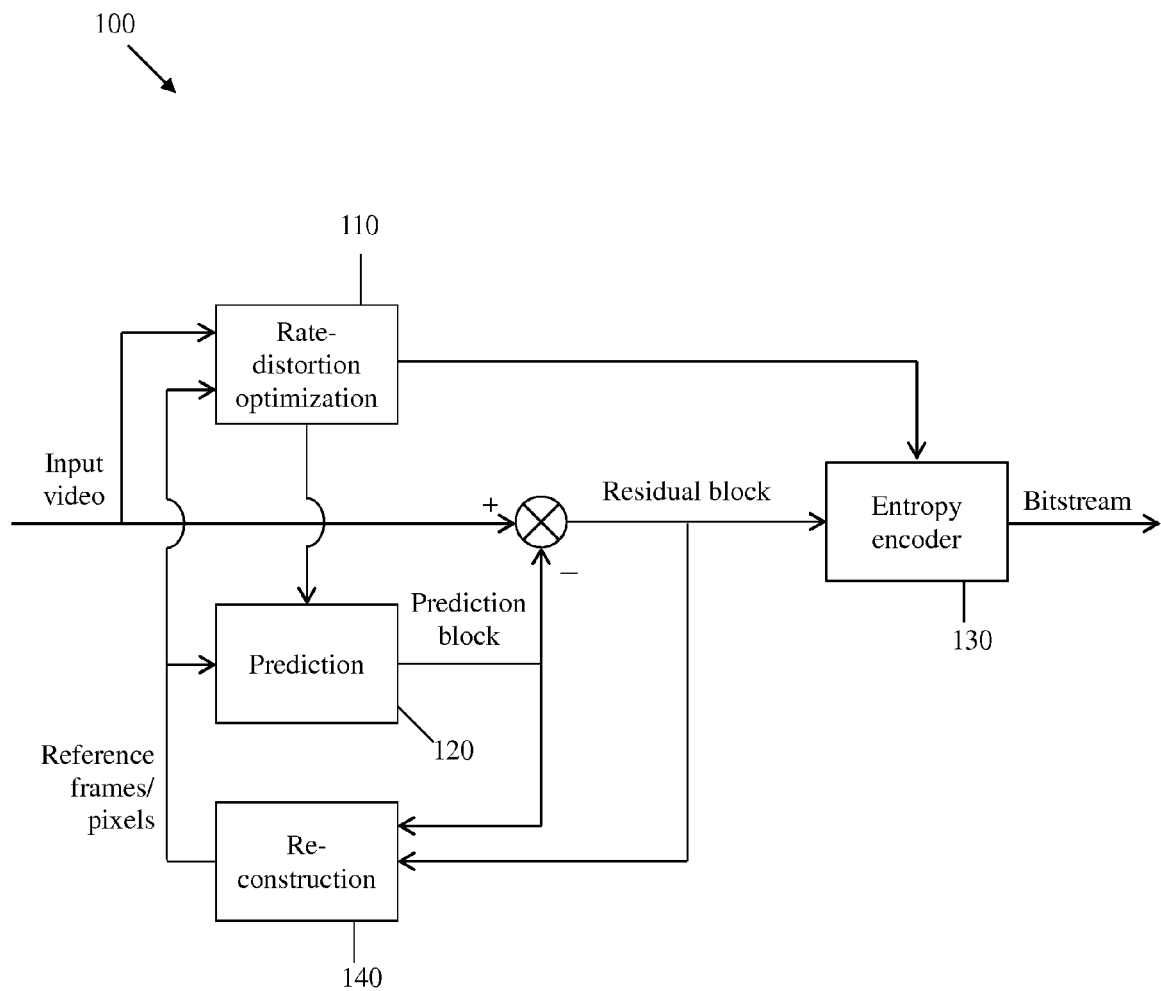
FIG. 1 is a schematic diagram of an embodiment of a transform bypass encoding scheme.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . or 255) that represents an image quality or characteristic, such as luminance or chrominance, at the corresponding reference point. In use, an image or video frame may comprise a large amount of pixels (e.g., 2,073,600 pixels in a 1920×1080 frame), thus it may be cumbersome and inefficient to encode and decode (referred to hereinafter simply as code) each pixel independently. To improve coding efficiency, a video frame is usually broken into a plurality of rectangular blocks or macroblocks, which may serve as basic units of processing such as prediction, transform, and quantization. For example, a typical N×N block may comprise $N^2$ pixels, where N is an integer greater than one and is often a multiple of four.

In a working draft of the International Telecommunications Union (ITU) Telecommunications Standardization Sector (ITU-T) and International Organization for Standardization (ISO)/International Electrotechnical Commission (IEC), High Efficiency Video Coding (HEVC), which is poised to be the next video standard, new block concepts have been introduced. For example, coding unit (CU) may refer to a sub-partitioning of a video frame into rectangular blocks of equal or variable size. In HEVC, a CU may replace macroblock structure of previous standards. Depending on a mode of inter or intra prediction, a CU may comprise one or more prediction units (PUs), each of which may serve as a basic unit of prediction. For example, for intra prediction, a 64×64 CU may be symmetrically split into four 32×32 PUs. For another example, for an inter prediction, a 64×64 CU may be asymmetrically split into a 16×64 PU and a 48×64 PU. Similarly, a PU may comprise one or more transform units (TUs), each of which may serve as a basic unit for transform and/or quantization. For example, a 32×32 PU may be symmetrically split into four 16×16 TUs. Multiple TUs of one PU may share a same prediction mode, but may be transformed separately. Herein, the term block may generally refer to any of a macroblock, CU, PU, or TU.

Depending on the application, a block may be coded in either a lossless mode (i.e., no distortion or information loss) or a lossy mode (i.e., with distortion). In use, high quality videos (e.g., with YUV subsampling of 4:4:4) may be coded using a lossless mode, while low quality videos (e.g., with YUV subsampling of 4:2:0) may be coded using a lossy mode. Sometimes, a single video frame or slice may employ both lossless and lossy modes to code a plurality of regions, which may be rectangular or irregular in shape. Each region may comprise a plurality of blocks. For example, a compound video may comprise a combination of different types of contents, such as texts, computer graphics, and natural-view content (e.g., camera-captured video). In a compound frame, regions of texts and graphics may be coded in a lossless mode, while regions of natural-view content may be coded in a lossy mode. Lossless coding of texts and graphics may be desired, e.g. in computer screen sharing applications, since lossy coding may lead to poor quality or fidelity of texts and graphics, which may cause eye fatigue. Current HEVC test models (HMs), such as HM 3.0, may code natural-view content fairly efficiently. However, the current HMs may lack a lossless coding mode for certain videos, thus their coding efficiency and speed may be limited.

When coding a block, a prediction block may be generated based on one or more previously coded reference blocks. The prediction block may be an estimated version of the block. A residual block may be generated by subtracting the block from the prediction block, or vice versa, which may represent prediction residuals or errors. A residual value of the residual block may also be used to represent the prediction residual. Since an amount of data needed to represent the prediction residuals may typically be less than an amount of data needed to represent the original block, the residual block may be encoded to achieve a higher compression ratio. In lossy coding schemes of current HMs, through a two-dimensional transform, e.g. a transform that closely resemble discrete cosine transform (DCT), residual values of the residual block in a spatial domain may be converted to transform coefficients in a frequency domain. In a transform matrix, low-index transform coefficients (e.g., in a top-left section), e.g., corresponding to big spatial features with low spatial frequency components, may have relatively high magnitudes, while high-index transform coefficients (e.g., in a bottom-right section), e.g., corresponding to small spatial features with high spatial frequency components, may have relatively small magnitudes. Further, in a following quantization operation, a number of high-index transform coefficients may be reduced to zero, which may be skipped in subsequent coding steps.

Since zero transform coefficients may be concentrated in a bottom-right section of the transform matrix, an end of block (EOB) symbol may be used to indicate a last non-zero transform coefficients. Then, both the sign (positive or negative) and absolute value of each non-zero transform coefficient may be coded. Since the signs of transform coefficients may be randomly distributed in the transform matrix, they may be coded without any probability model.

Disclosed herein are systems and methods for improved video coding. The disclosure provides a transform bypass lossless coding scheme, which may bypass a transform step and a quantization step, and directly encode prediction residuals of a residual block. The residual block may have different properties from a transform matrix, e.g., large residual values may be in any position instead of being concentrated in a top-left section, thus various coding tools are described to efficiently encode the residual block. In an embodiment, an adaptive scanning scheme may adaptively determine a starting position based on a distribution pattern of the residual values and/or a scanning order based on a prediction mode used in generating the residual block. A full map may be generated to indicate all non-zero residual values. Since signs of the prediction residuals may show spatial correlations, context modeling may be used to improve a compression ratio in coding the signs. Further, since absolute values of the prediction residuals may have relatively large magnitudes, an inversion operation may be performed, and inverted absolute values may be encoded using an entropy encoder. The residual blocks whose prediction residuals are inverted may be signaled via a luminance (luma) level inversion flag and a chrominance (chroma) level inversion flag. In the present disclosure, due to implementation of the coding tools in the transform bypass lossless coding scheme, videos such as a compound video may be efficiently coded with high fidelity.

In use, there may be a module before an encoder to analyze contents of a video frame, and identify certain regions (e.g., texts and/or graphics regions) where lossless encoding is desired. Information or instructions regarding which regions to encode in a lossless mode may be passed to the encoder. Based on the information, the encoder may encode the identified regions using the lossless mode. Alternatively, a user may manually define certain regions to be encoded using a lossless mode, and provide the encoder with information identifying these regions. Thus, a video (e.g., a compound video) may be encoded in a lossless mode and/or a lossy mode, depending on information received by the encoder. Herein, the lossless encoding mode may include transform bypass encoding and transform without quantization encoding. These two lossless encoding schemes as well as a lossy encoding scheme are described herein.

Likewise, based on information contained in a received bitstream, a video decoder may decode a video frame using a lossless mode and/or a lossy mode. The lossless decoding mode may include transform bypass decoding and transform without quantization decoding. The two lossless decoding schemes as well as a lossy decoding scheme are described herein.

FIG. 1 illustrates an embodiment of a transform bypass encoding scheme 100, which may be implemented in a video encoder. The transform bypass encoding scheme 100 may comprise a rate-distortion optimization (RDO) module 110, a prediction module 120, an entropy encoder 130, and a reconstruction module 140 arranged as shown in FIG. 1. In operation, an input video comprising a sequence of video frames (or slices) may be received by the encoder. Herein, a frame may refer to any of a predicted frame (P-frame), an intra-coded frame (I-frame), or a bi-predictive frame (B-frame). Likewise, a slice may refer to any of a P-slice, an I-slice, or a B-slice.

The RDO module 110 may be configured to make logic decisions for one or more of other modules. In an embodiment, based on one or more previously encoded frames, the RDO module 110 may determine how a current frame (or slice) being encoded is partitioned into a plurality of CUs, and how a CU is partitioned into one or more PUs and TUs. For example, homogeneous regions of the current frame (i.e., no or slight difference among the pixel values in the regions) may be partitioned into relatively larger blocks, and detailed regions of the current frame (i.e., significant difference among the pixel values in the regions) may be partitioned into relatively smaller blocks.

In addition, the RDO module 110 may control the prediction module 120 by determining how the current frame is predicted. The current frame may be predicted via inter and/or intra prediction. Inter prediction (i.e., inter frame prediction) may exploit temporal redundancies in a sequence of frames, e.g. similarities between corresponding blocks of successive frames, to reduce compression data. In inter prediction, the RDO module 110 may determine a motion vector of a block in the current frame based on a corresponding block in one or more reference frames. On the other hand, intra prediction may exploit spatial redundancies within a single frame, e.g., similarities between adjacent blocks, to reduce compression data. In intra prediction, reference pixels adjacent to a current block may be used to generate a prediction block. Intra prediction (i.e., intra frame prediction) may be implemented using any of a plurality of available prediction modes or directions (e.g., 35 modes for luma components in HEVC), which may be determined by the RDO module 110. For example, the RDO module 110 may calculate a sum of absolute error (SAE) for each prediction mode, and select a prediction mode that results in the smallest SAE.

Based on logic decisions made by the RDO module 110, the prediction module 120 may utilize either one or more reference frames (inter prediction) or a plurality of reference pixels (intra prediction) to generate a prediction block, which may be an estimate of a current block. Then, the current block may be subtracted by the prediction block, thereby generating a residual block. The residual block may comprise a plurality of residual values, each of which may indicate a difference between a pixel in the current block and a corresponding pixel in the prediction block. Then, all values of the residual block may be scanned and encoded by the entropy encoder 130 into an encoded bitstream. The entropy encoder 130 may employ any entropy encoding scheme, such as context-adaptive binary arithmetic coding (CABAC) encoding, exponential Golomb encoding, or fixed length encoding, or any combination thereof. In the transform bypass encoding scheme 100, since the residual block is encoded without a transform step or a quantization step, no information loss may be induced in the encoding process.

To facilitate continuous encoding of video frames, the residual block may also be fed into the reconstruction module 140, which may generate either reference pixels for intra prediction of future blocks or reference frames for inter prediction of future frames. If desired, filtering may be performed on the reference frames/pixels before they are used for inter/intra prediction. A person skilled in the art is familiar with the functioning of the prediction module 120 and the reconstruction module 140, so these modules will not be further described. It should be noted that FIG. 1 may be a simplified illustration of a video encoder, thus it may only include a portion of modules present in the encoder. Other modules (e.g., filter, scanner, and transmitter), although not shown in FIG. 1, may also be included to facilitate video encoding. Prior to transmission from the encoder, the encoded bitstream may be further configured to include other information, such as video resolution, frame rate, block partitioning information (sizes, coordinates), prediction modes, etc., so that the encoded sequence of video frames may be properly decoded.

Figure 2:
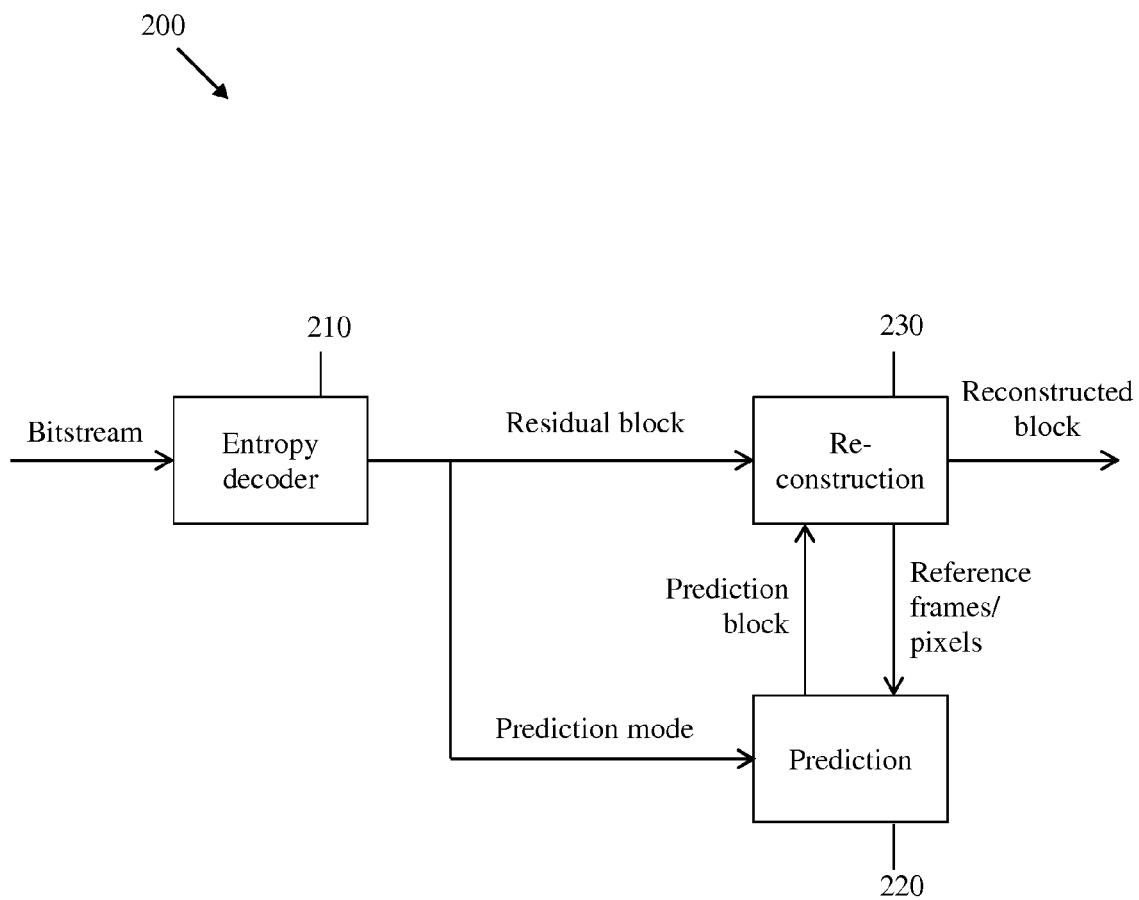
FIG. 2 is a schematic diagram of an embodiment of a transform bypass decoding scheme.

FIG. 2 illustrates an embodiment of a transform bypass decoding scheme 200, which may be implemented in a video decoder. The transform bypass decoding scheme 200 may correspond to the transform bypass encoding scheme 100, and may comprise an entropy decoder 210, a prediction module 220, and a reconstruction module 230 arranged as shown in FIG. 2. In operation, an encoded bitstream containing information of a sequence of video frames may be received by the entropy decoder 210, which may decode the bitstream to an uncompressed format. The entropy decoder 210 may employ any entropy decoding scheme, such as CABAC decoding, exponential Golomb decoding, or fixed length encoding, or any combination thereof.

For a current block being decoded, a residual block may be generated after the execution of the entropy decoder 210. In addition, information containing a prediction mode of the current block may also be decoded by the entropy decoder 210. Then, based on the prediction mode, the prediction module 220 may generate a prediction block for the current block. If the prediction mode is an inter mode, one or more previously decoded reference frames may be used to generate the prediction block. Otherwise, if the prediction mode is an intra mode, a plurality of previously decoded reference pixels may be used to generate the prediction block. Then, the reconstruction module 230 may combine the residual block with the prediction block to generate a reconstructed block. Additionally, to facilitate continuous decoding of video frames, the reconstructed block may be used in a reference frame to inter predict future frames. Some pixels of the reconstructed block may also serve as reference pixels for intra prediction of future blocks in the same frame.

In use, if an original block is encoded and decoded using lossless schemes, such as the transform bypass encoding scheme 100 and the transform bypass decoding scheme 200, no information loss may be induced in the entire coding process. Thus, barring distortion caused during transmission, a reconstructed block may be exactly the same with the original block. This high fidelity of coding may improve a user's experience in viewing video contents such as texts and graphics.

Suppose, for example, the luma component of a pixel in a current block is i, and the luma component of a corresponding pixel in a prediction block is j, where i and j are non-negative natural numbers in a pre-determined range (e.g., 0-255 for a color depth of 8 bits). Then, a luma difference between the two luma components, denoted as k, may be simply calculated via an equation: $k=i-j$. k may be a positive or negative integer, and the range of k depends on the pre-determined range for i and j. For example, for i and j between 0 and 255, k varies between −255 and 255. A luma level or magnitude may refer to an absolute value of the luma difference (i.e., $|k|$), thus the luma level always has a non-negative value. It should be noted that, although the supposition above uses the luma component, descriptions regarding the luma component is equally applicable to the chroma component. Unless specified otherwise, hereinafter a residual value may refer to a luma difference or a chroma difference, and a residual level or magnitude may refer to a luma level or a chroma level. Also, when a transform step is bypassed in a coding process, the term coefficient (except when used in phrase "transform coefficient") may hereinafter refer to the residual value.

When a transform bypass encoding scheme is used, all residual values may be scanned and encoded using an entropy encoder. Without a transform step to concentrate non-zero residual values in the top-left corner of the transform matrix, the non-zero residual values may appear in random positions of the residual block. Further, in contrast with non-zero transform coefficients whose absolute values (i.e., levels) are typically larger in the top-left corner and smaller in the bottom-right corner, non-zero residual levels may also be relatively more randomly distributed in the residual block. For example, a peak residual level may appear at any position, such as the most top-left, the most bottom-right position, or any other position. Thus, the probability of large residual levels appearing in the bottom-right corner of the residual block may still be significant.

In an embodiment, all residual values may be adaptively scanned before being encoded. A variety of starting position and/or scanning orders may be used in an adaptive scanning scheme. Further, the adaptive scanning scheme may be based on a distribution pattern of the non-zero residual values and/or an intra prediction mode used in generation of the residual block. In use, a RDO module may be configured to determine an optimal scanning scheme. For example, the RDO may be configured to test various combinations of starting positions and scanning orders. A number of encoded bits for the residual block may be calculated for each tested combination. Then, the RDO may select a combination of starting position and scanning order which leads to a lowest number of encoded bits.

In an embodiment, an adaptive scanning scheme may determine an optimal starting position based on a distribution pattern of the non-zero residual values. Consider, for example, a N×N residual block with residual values denoted as $Z(m, n)$, where N is an integer greater than one, m is a row index varying between 0 and N−1, n is a column index varying between 0 and N−1, and $Z(m, n)$ is a residual value at position (m, n). It should be noted that although a N×N square block is used herein for illustrative purposes, a non-square rectangular block may also be similarly used. In an embodiment, if the non-zero residual values are concentrated at positions close to the bottom-right corner, the scanning of residual values may start from residual value $Z(N−1,N−1)$. Otherwise, if the non-zero residual values are concentrated at positions close to the top-left corner, the scanning of residual values may start from residual value $Z(0,0)$. Similarly, scanning may also start from $Z(0,N−1)$ or $Z(N−1,0)$.

In use, information regarding a starting position may be included to a bitstream to facilitate future decoding. In an embodiment, to represent different starting positions, a 2-bit syntax element, denoted as (C0, C1), may be introduced in an encoded bitstream under the context of a HEVC syntax. (C0, C1) may be configured to indicate:

$$(C0, C1) = \begin{cases} 00, & \text{starting from } Z(0, 0); \\ 01, & \text{starting from } Z(N-1, 0); \\ 10, & \text{starting from } Z(0, N-1); \\ 11, & \text{starting from } Z(N-1, N-1). \end{cases}$$

From the (C0, C1) above, a '00' syntax element, for example, may indicate that the scanning of residual values starts from $Z(0, 0)$. It should be understood that an assigned value of the syntax element may be changed within the principle of the present disclosure. For example, if desired, the interpretation of the a '00' syntax element may be changed such that it indicates a starting position of $Z(0,N−1)$.

In an embodiment, an adaptive scanning scheme may determine an optimal scanning order based on an intra prediction mode used in generating the residual block. There may be a plurality of intra prediction modes (e.g., up to 35 modes in HEVC with 33 directional modes for luma components), thus various directions (e.g., vertical, horizontal, diagonal, and other directions) may be used. In an embodiment, if the intra prediction direction is vertical, residual values may be scanned in a horizontal direction (i.e., row by row). If the intra prediction direction is horizontal, the residual values may be scanned in a vertical direction (i.e., column by column). If the intra prediction direction is in a 45-degree diagonal angle, residual values may be scanned in a zigzag order. Other intra prediction directions may be classified in a vertical or horizontal group based on their relative proximity with a vertical axis or and a horizontal axis. For example, if an intra prediction direction has an angle smaller than 45 degrees with the vertical axis, the intra prediction direction may be classified in the vertical group, and the residual values may be scanned in the horizontal direction. For another example, if an intra prediction direction has an angle smaller than 45 degrees with the horizontal axis, the intra prediction direction may be classified in the horizontal group, and the residual values may be scanned in the vertical direction.

After scanning all residual values, a full significant coefficient map may be generated to indicate positions of significant coefficients or residual values. In an embodiment, the significant coefficients are simply non-zero coefficients. The full significant coefficient map may comprise a plurality of binary symbols, wherein each binary symbol of '1' at a certain position indicates a non-zero coefficient. All binary symbols may be encoded and included to the bitstream. In comparison with current encoding schemes, which may use an end of block (EOB) symbol to indicate a last significant transform coefficient, a disclosed transform bypass encoding scheme may produce a residual block in which any coefficient may potentially have a large absolute value. Thus, in the present disclosure, the EOB symbol may be removed from the bitstream.

After the significant coefficient map is generated, non-zero residual values may be encoded using an entropy encoder. Each non-zero residual value has two properties—a residual sign, which may be positive (+) or negative (−), and a residual level, which is a positive magnitude. In an embodiment, the residual signs and the residual levels may be encoded separately, as further described below.

Residual signs may be encoded using an entropy encoder. A symbol of '1' may be used to represent '+', and a symbol of '0' may be used to represent '−'. The '1' and '0' symbols may be encoded using, for example, a CABAC algorithm. Unlike transform coefficients whose signs may be randomly distributed in a transform matrix, there may exist spatial correlations among residual signs in a residual block. Consequently, to achieve higher compression ratio in encoding the residual signs, context modeling may be introduced to adaptively change a positive or negative probability. Depending on the application, any appropriate number of context models may be used in a CABAC entropy encoder. In an embodiment, one context model may be used. In this case, an associated probability state and its most probable symbol (MPS) may vary adaptively based on past encoded residual signs, which may be an inherit the property of a context model in a CABAC entropy encoder.

In another embodiment, a plurality of context models may be used in the CABAC entropy encoder. Each context model may correspond to a different pattern of several previously encoded residual signs. For example, two residual signs, which are encoded immediately before a current residual sign, may be considered in the context modeling. Depending on the two residual signs, four context models may be used. In an embodiment, context models with indexes 0, 1, 2, 3 may respectively correspond to four cases when the two previously encoded residual signs are (+, +), (+, −), (−, +) and (−, −). It should be understood that the correspondence between a context model index and a pattern of signs may be altered within principles of the present disclosure. For example, although the index '2' above corresponds to the pattern (−, +), if desired, the meaning of the index '2' may be modified such that it corresponds to the pattern (−,−) instead.

After encoding non-zero-valued (or simply referred to as non-zero) residual signs, non-zero residual levels may be encoded using an entropy encoder. As mentioned previously, since no transform or quantization is performed, residual levels may still be large (e.g., close or equal to 255). In a video frame, large luma and/or chroma residual levels may often occur in a region which contains sharp edges, lines, and/or texture features, such as black texts on a white background. Thus, to efficiently encode the potentially large luma and chroma residual levels, a level inversion flag, which may refer to either a luma or chroma level inversion flag hereinafter, may be set, for example, on the PU level. The level inversion flag may indicate whether the non-zero residual levels should be inverted before encoding.

In use, a RDO module may be configured to determine whether a residual level should be inverted. Consider, for example, encoding non-zero residual levels in a residual block of a PU. If an average of the non-zero residual levels is above a certain pre-set boundary (e.g., 127 for the level range of 1-255), a level inversion flag of '1' may be assigned to the residual block of the PU. Otherwise, if the average is below the pre-set boundary, a level inversion flag of '0' may be assigned to the residual block. When the level inversion flag is '1', the level inversion operation may be applied to all non-zero residual levels in the residual block. In an alternative embodiment, an RDO module (e.g., the RDO module in FIG. 1) may determine whether to perform an inversion operation if a number of encoded bits after inversion is less than a number of encoded bits without the inversion operation.

For each residual block, both the luma and chroma level inversion flags may be encoded using an entropy encoder (e.g., the entropy encoder 130 in FIG. 1) to a compressed format. The entropy encoder may be implemented using a CABAC algorithm, which may use a plurality of context models. In an embodiment, three context models may be used for each of the luma and chroma level inversion flags. To improve coding efficiency, the entropy encoder may select a context model based on an index, which may be correlated to level inversion flags of adjacent PUs. Consider, for example, the coding of a luma level inversion flag for a current PU, with the assumption that a chroma level inversion flag for the current PU may be coded in a same or similar way. Two adjacent PUs—an upper PU and a left PU may also have luma level inversion flags. Thus, a sum of the two luma level inversion flags of the adjacent PUs may be configured to be the index selected for the current PU. If either the upper PU or the left PU does not have a luma level inversion flag (e.g., the current PU is on a boundary of a transform bypass encoding region), '0' may be assigned to the luma level inversion flag. After entropy encoding using the selected context model, the encoded luma level inversion flag may be included into the bitstream. Similarly, encoded chroma level inversion flag may be included into the bitstream.

If a level inversion flag for a residual block is '1', a level inversion operation may be performed on all non-zero residual levels of the residual block. Assuming a non-zero residual level, denoted as x where x is an integer, is within a range of [1-255], an inversion operation may change the level x to an inverted level of (255−x). For a large residual level, the level inversion operation may produce a smaller number, which leads to more efficient encoding (e.g., since the entropy encoder may be designed to compress small numbers more efficiently than large numbers). Then, the residual levels, either inverted or non-inverted, may be encoded using an entropy encoder. In an embodiment, depending on a magnitude of a residual level, the entropy encoder may employ different algorithms. For example, assuming the level, either an inverted level or a non-inverted level, is within range [1, 255], when the level is smaller than 3, a truncated unary code may be used to binarize the level. When the level is equal to or greater than 3, a combination of a truncated unary code and a fixed length code may be used to binarize the level. This binarization scheme may be illustrated in Table 1 below, where "Level" denotes the value of a non-zero inverted or non-inverted residual level.

TABLE 1

A inverted level coding scheme based on a magnitude of the inverted level.

| Level | B0 | B1 | B2 | B3 | B4 | B5 | B6 | B7 | B8 | B9 |
|---|---|---|---|---|---|---|---|---|---|---|
| 1 | 0 | | | | | | | | | |
| 2 | 1 | 0 | | | | | | | | |
| 3 | 1 | 1 | 0 | 0 | 0 | 0 | 0 | 0 | 0 | 0 |
| 4 | 1 | 1 | 1 | 0 | 0 | 0 | 0 | 0 | 0 | 0 |
| 5 | 1 | 1 | 0 | 1 | 0 | 0 | 0 | 0 | 0 | 0 |
| ... | | | | | | | | | | |
| 255 | 1 | 1 | 0 | 0 | 1 | 1 | 1 | 1 | 1 | 1, |

As illustrated in Table 1, up to ten bits (from least significant bit B0 to most significant bit B9) may be used to encode the level. When the level equals 1, one bit (B0) is used. When the level equals 2, two bits (B0 and B1) are used. When the inverted level is within range [3-255], ten bits (B0-B9) are used, wherein both B0 and B1 equal to 1 and B2-B9 are an eight-bit binary representation of the value of the level minus 3 (i.e., Level-3). In the ten bits, B0 and B1 may be encoded using CABAC with context models, while B2-B9 may be encoded in a CABAC bypass mode.

Alternatively, in an embodiment, a combination of a truncated unary code, a truncated Golomb-Rice code and a fixed length code may be used to binarize the inverted levels. In the truncated Golomb-Rice code, a residual level (denoted as n), either inverted or non-inverted, may be decomposed into a prefix part (denoted as p) and a remainder part (denoted as r). For a specific Golomb-Rice parameter (denoted as k), the prefix and reminder parts may be expressed as:

$$p = \left\lfloor \frac{n}{k} \right\rfloor$$

$$r = n - pk \text{ (or } n \bmod k\text{)}$$

The prefix part p may be coded using a truncated unary (TU) code, while the remainder part r may be coded using a fix-length code of length k. For more details on the truncated Golomb-Rice code, please refer to a report entitled "Reduced-Complexity Entropy Coding of Transform Coefficient Levels Using a Combination of VLC and PIPE," by T. Nguyen, M. Winken, D. Marpe, H. Schwarz, and T. Wiegand in the 4*th Meeting of the Joint Collaborative Team on Video Coding (JCT-VC) of ITU-T SG*16 *WP*3 *and ISO/IEC JTC*1/ *SC*29/*WG*11, Daegu, K R, 20-28 Jan. 2011, Doc. JCTVC-D336, which is hereby incorporated by reference.

Figure 3:
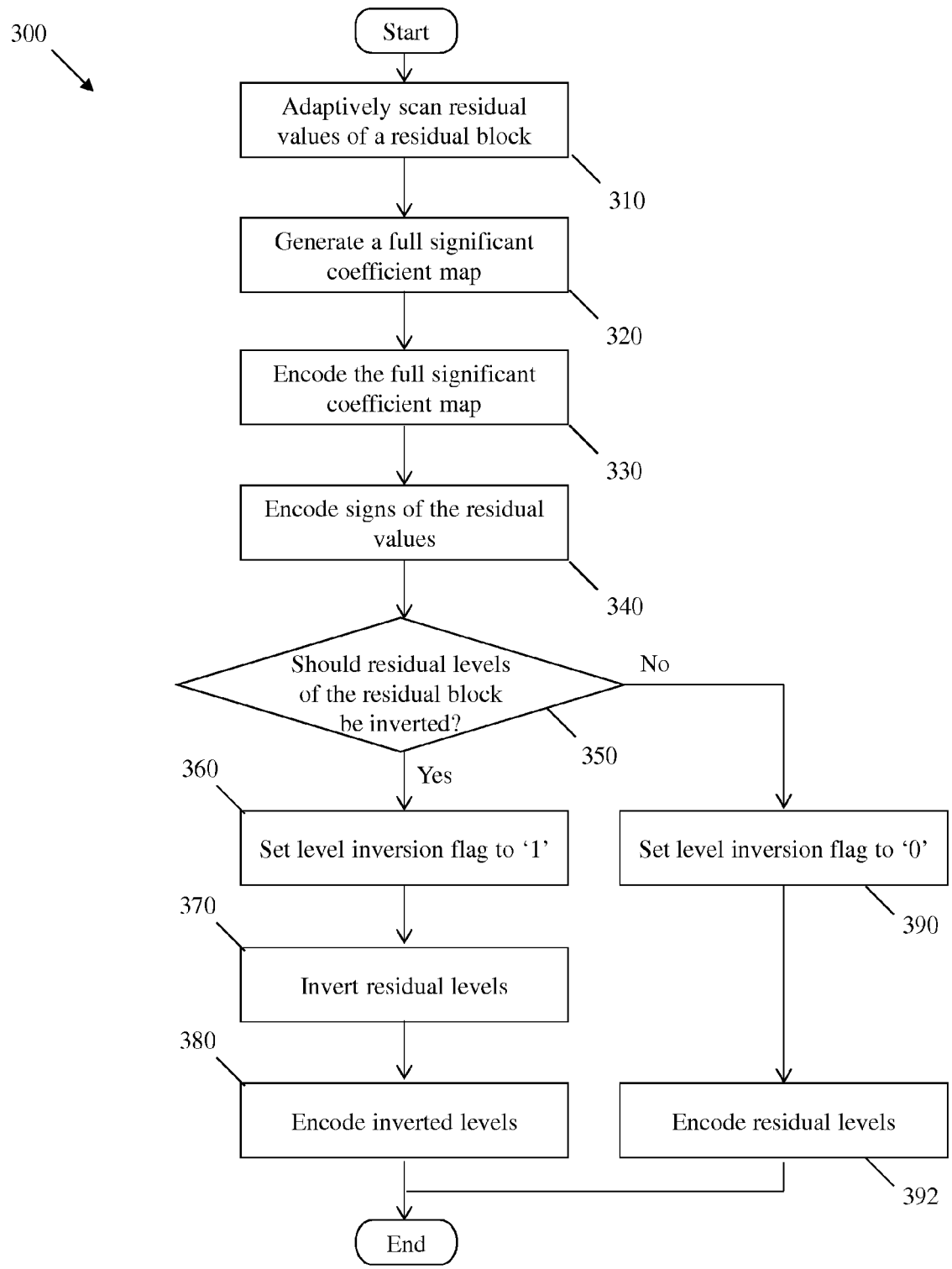
FIG. 3 is a flowchart of an embodiment of a residual block encoding method.

FIG. 3 illustrates an embodiment of a residual block encoding method 300. The method 300 may be part of a transform bypass encoding scheme (e.g., the transform bypass encoding scheme 100 in FIG. 1), which may be implemented in an encoder. The method 300 may start in step 310, where all residual values of a residual block may be scanned. In an embodiment, an adaptive scanning scheme may flexibly determine a starting position based on a distribution pattern of the residual values. For example, the starting position may be close to where non-zero residual values are concentrated. The starting position may be any of the four corners of the residual block, and each corner may be encoded as a 2-bit syntax element. Further, the adaptive scanning scheme may flexibly determine a scanning order based on an intra prediction mode used in generating the residual block. For example, if the intra prediction direction is vertical, residual values may be scanned in a horizontal direction (i.e., row by row). If the intra prediction direction is horizontal, the residual values may be scanned in a vertical direction (i.e., column by column).

Next, in step 320, a full significant coefficient map may be generated to indicate positions of non-zero coefficients. The full significant coefficient map may comprise a plurality of binary symbols, wherein each binary symbol of '1' at a certain position indicates a non-zero coefficient. However, either a '1' or a '0' may be used to indicate a non-zero coefficient. For example, if desired, the binary symbol may be changed to '0' to indicate the non-zero coefficient. Next, in step 330, the full significant coefficient map may be encoded using an entropy encoder. All encoded binary symbols of the full significant coefficient map may be included into a bitstream. With encoding of the full significant map, there may be no need to encode a last position of the non-zero levels in a scanning order as specified in the HEVC working draft.

Next, in step 340, signs (+ or −) of non-zero residual values may be encoded. A symbol of '1' may be used to represent '+', and a symbol of '0' may be used to represent '−'. The '1' and '0' symbols may be encoded using, for example, a CABAC algorithm. Since spatial correlations may exist among the signs, context modeling may be introduced to adaptively change a probability of a sign being '+' or '−'. In an embodiment, one context model may be used, in which an associated probability state and its most probable symbol (MPS) may vary adaptively based on past encoded residual signs. In another embodiment, four context models with indexes 0, 1, 2, 3 may respectively correspond to four cases when two previously encoded residual signs are (+, +), (+, −), (−, +) and (−, −).

Next, in step 350, the method 300 may determine if residual levels should be inverted before encoding. In an embodiment, a RDO module (e.g., the RDO module 110 in FIG. 1) may be configured to make this logic decision based on a pre-set boundary of residual levels. If the condition in the block 350 is met, the method 300 may proceed to step 360. Otherwise, the method 300 may proceed to step 390. In step 360, a level inversion flag may be set to '1'. Next, in step 370, an inversion operation may be performed on all non-zero residual levels to generate inverted levels. Next, in step 380, the inverted levels may be encoded using an entropy encoder. Depending on a magnitude of an inverted level, the entropy encoder may employ different algorithms. In an embodiment, as illustrated in Table 1, assuming the inverted level is within range [1, 255], when the inverted level is smaller than 3, a truncated unary code may be used for binarization. When the inverted level is equal to or greater than 3, a combination of a truncated unary code and a fixed length code may be used for binarization. In another embodiment, a combination of a truncated unary code, a truncated Golomb-Rice code and a fixed length code may be used to binarize the inverted levels.

If residual levels are encoded directly without inversion, in step 390, the level inversion flag may be set to '0'. Next, in step 392, the residual levels may be encoded using an entropy encoder. The residual levels may be encoded using one or more algorithms that are the same with or different from the inverted levels. It should be understood that the method 300 may only include a portion of all necessary encoding steps, thus other steps, such as prediction and transmission, may also be incorporated into the encoding process wherever appropriate.

Figure 4:
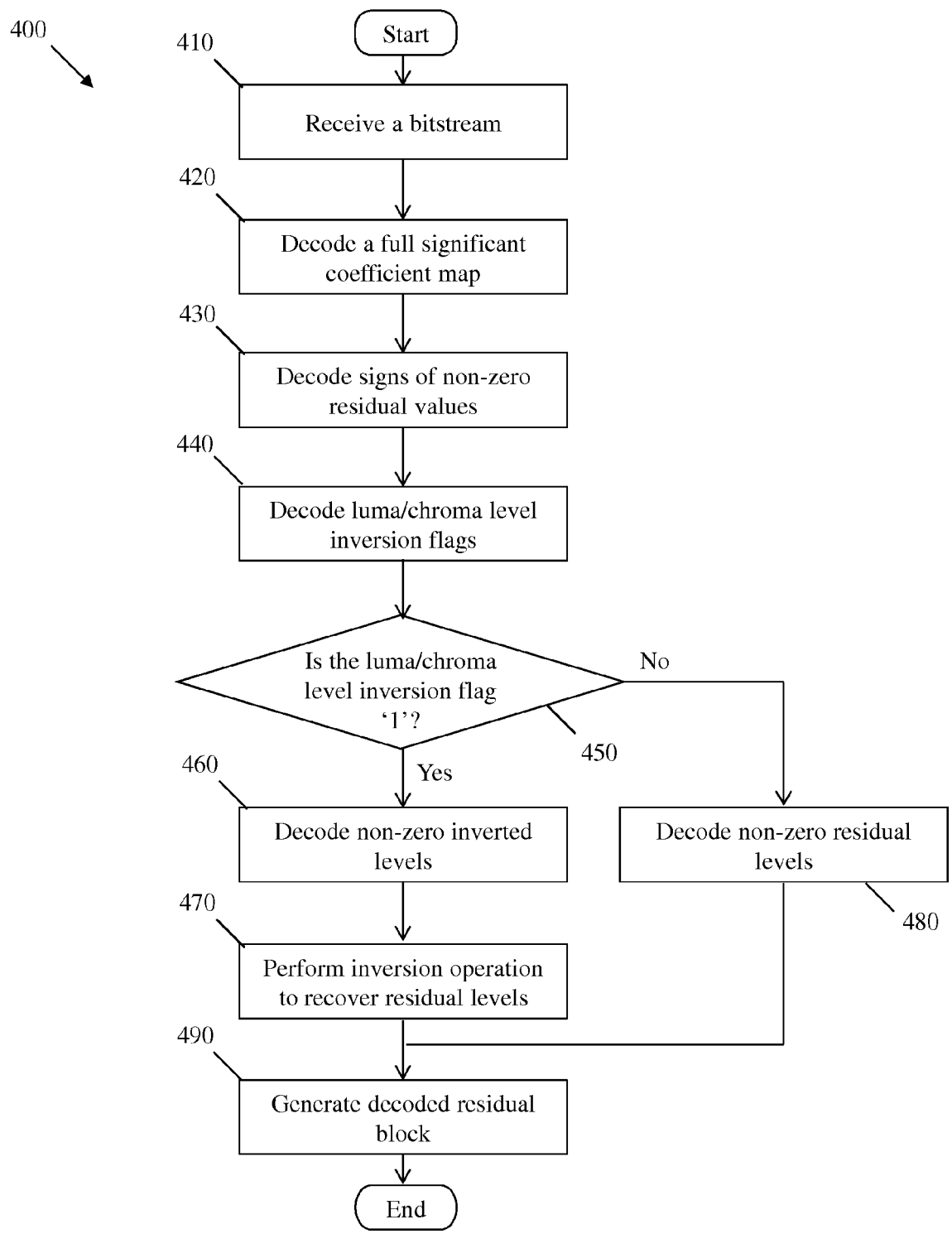
FIG. 4 is a flowchart of an embodiment of a residual block decoding method.

FIG. 4 illustrates an embodiment of a residual block decoding method 400, which may correspond to the residual block encoding method 300. The method 400 may be part of a transform bypass decoding scheme (e.g., the transform bypass decoding scheme 200 in FIG. 2), which may be implemented in a decoder. The method 400 may start in step 410, where a bitstream comprising a plurality of encoded residual blocks may be received. Next, for each encoded residual block (e.g., PU), in step 420, a full significant coefficient map may be decoded from the bitstream by the entropy decoder. Thus, positions of non-zero residual values may be made known.

Next, in step 430, signs of all non-zero residual values may be decoded from the bitstream by an entropy decoder. The signs may be decoded using one or more context models. Next, in step 440, a luma level inversion flag and a chroma level inversion flag may be decoded from the bitstream using an entropy decoder. Next, in step 450, the method 400 may determine if the luma level inversion flag is '1', which indicates that the encoded residual block comprises encoded inverted levels. If the condition in the block 450 is met, the method 400 may proceed to step 460. Otherwise, the method 400 may proceed to step 480. Note that descriptions regarding the luma level inversion flag may also be applicable to the chroma level inversion flag.

In step 460, the encoded inverted levels may be decoded from the bitstream by the entropy decoder. The entropy decoder may perform the inverse of an entropy encoder, thus its algorithm may correspond to the entropy encoder. Next, in step 470, an inversion operation may be performed on the inverted levels, thus residual levels may be recovered. In step 480, encoded residual levels may be decoded from the bitstream by the entropy decoder. Next, in step 490, an uncompressed residual block may be generated based on the decoded residual levels, the decoded signs, and the full significant coefficient map. It should be understood that the method 400 may only include a portion of all necessary decoding steps, thus other steps, such as prediction and reconstruction, may also be incorporated into the decoding process wherever appropriate.

Figure 5:
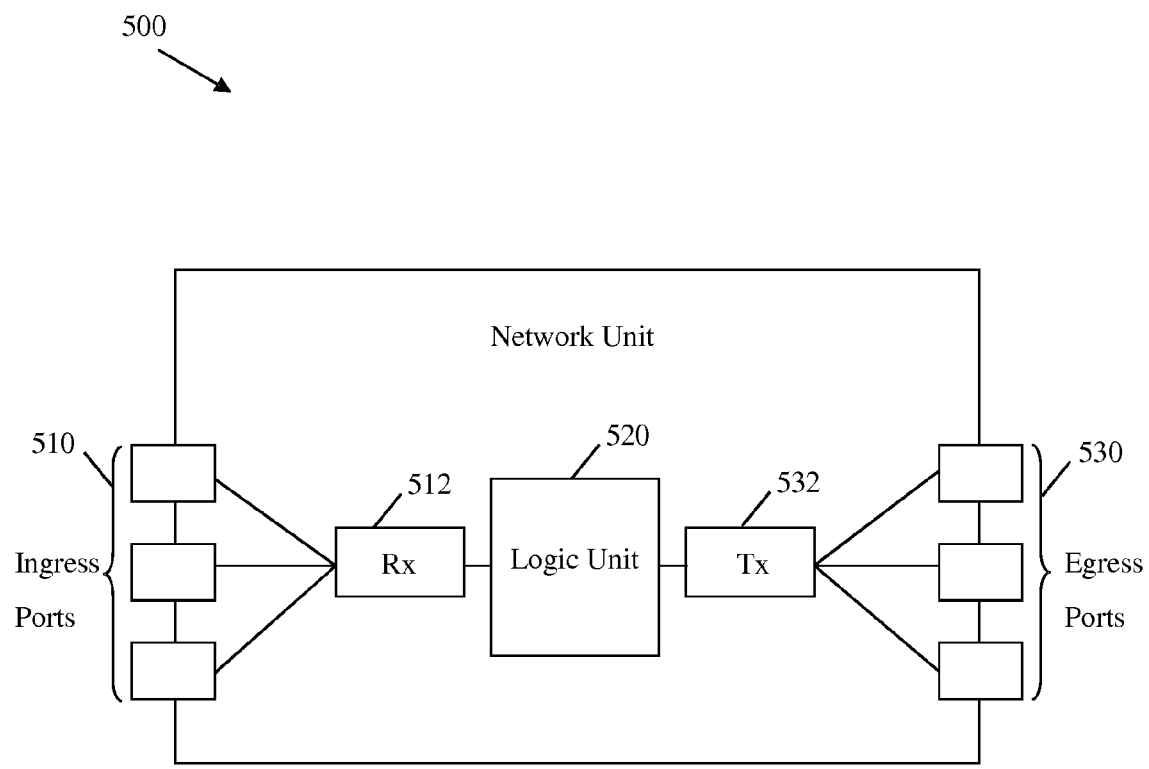
FIG. 5 is a schematic diagram of an embodiment of a network unit.

FIG. 5 illustrates an embodiment of a network unit 500, which may comprise an encoder and decoder (codec) that processes video frames as described above, for example, within a network or system. The network unit 500 may comprise a plurality of ingress ports 910 and/or receiver units (Rx)

512 for receiving data from other network units or components, logic unit or processor 520 to process data and determine which network unit to send the data to, and a plurality of egress ports 530 and/or transmitter units (Tx) 532 for transmitting data to the other network units. The logic unit or processor 520 may be configured to implement any of the schemes described herein, such as the transform bypass encoding scheme 100, the transform bypass decoding scheme 200, the residual block encoding method 300, and/or the residual block decoding method 400. The logic unit 520 may be implemented using hardware, software, or both.

Figure 6:
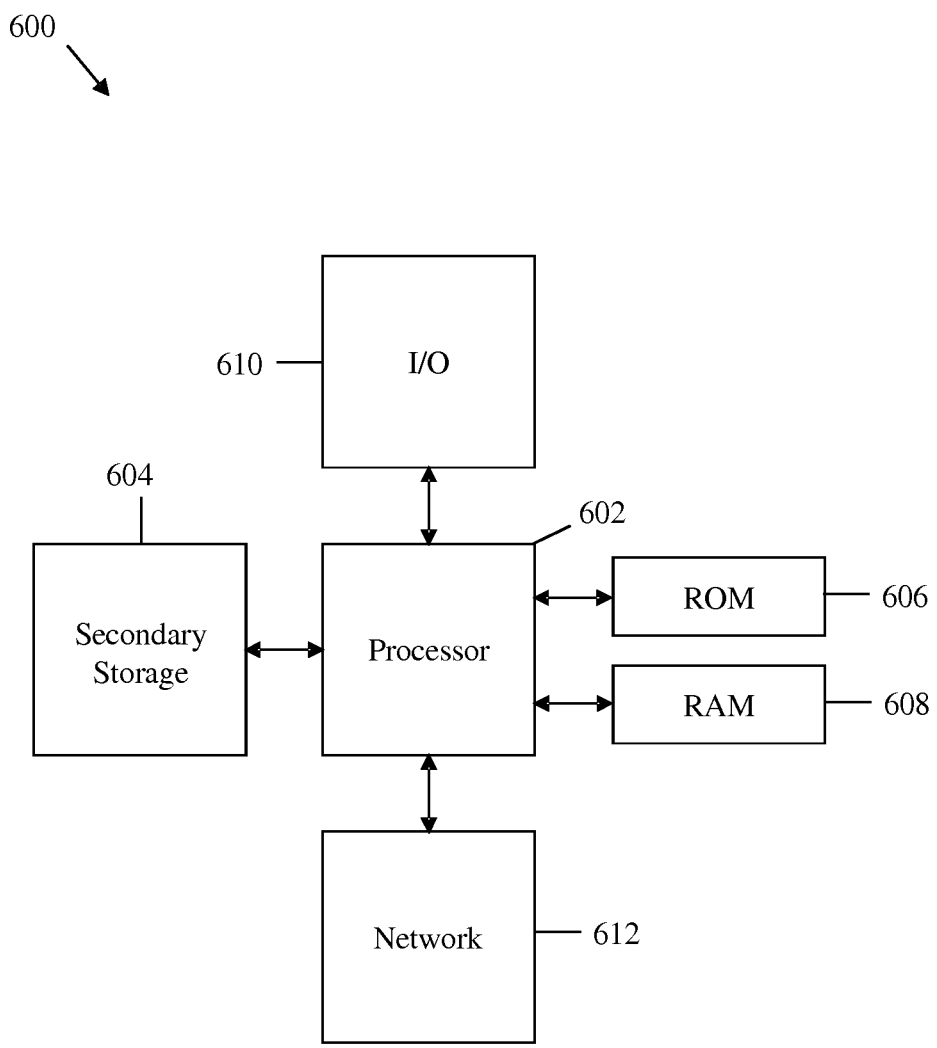
FIG. 6 is a schematic diagram of a general-purpose computer system.

The schemes described above may be implemented on any general-purpose network component, such as a computer or network component with sufficient processing power, memory resources, and network throughput capability to handle the necessary workload placed upon it. FIG. 6 illustrates a schematic diagram of a typical, general-purpose network component or computer system 600 suitable for implementing one or more embodiments of the methods disclosed herein, such as the residual block encoding method 300 and the residual block decoding method 400. The general-purpose network component or computer system 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. Although illustrated as a single processor, the processor 602 is not so limited and may comprise multiple processors. The processor 602 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 602 may be configured to implement any of the transform bypass encoding scheme 100, the transform bypass decoding scheme 200, the residual block encoding method 300, and/or the residual block decoding method 400. The processor 1002 may be implemented using hardware, software, or both.

The secondary storage 604 is typically comprised of one or more disk drives or tape drives and is used for non-volatile storage of data and as an over-flow data storage device if the RAM 608 is not large enough to hold all working data. The secondary storage 604 may be used to store programs that are loaded into the RAM 608 when such programs are selected for execution. The ROM 606 is used to store instructions and perhaps data that are read during program execution. The ROM 606 is a non-volatile memory device that typically has a small memory capacity relative to the larger memory capacity of the secondary storage 604. The RAM 608 is used to store volatile data and perhaps to store instructions. Access to both the ROM 606 and the RAM 608 is typically faster than to the secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus used in video encoding comprising:
a processor configured to:
generate a prediction block for a current block;
compute a difference between the current block and the prediction block to generate a residual block, wherein the residual block comprises a plurality of residual values; and
if the plurality of residual values includes at least one non-zero residual value comprising at least one sign and at least one residual level,
perform entropy encoding on the at least one sign; and
perform entropy encoding on the at least one residual level, wherein one non-zero residual value comprises one sign and one residual level, wherein the plurality of residual values includes at least one non-zero residual value, wherein entropy encoding of a sign is based on spatial correlation between the sign and one or more previously encoded signs, and wherein the plurality of residual values includes at least three non-zero residual values, wherein the three non-zero residual values have a first, second, and third signs, wherein performing entropy encoding on the first, second and third signs follows an encoding order, wherein the second sign immediately follows the first sign in the encoding order, wherein the third sign immediately follows the second sign in the encoding order, wherein performing entropy encoding on the third sign comprises using a context-adaptive binary arithmetic coding (CABAC) algorithm, wherein the CABAC algorithm has four context models selectable by an index, wherein the index equals 0, if the first and second signs are (+, +);
1, if the first and second signs are (+, −);
2, if the first and second signs are (−, +); and
3, if the first and second signs are (−, −).

2. The apparatus of claim 1, wherein the plurality of residual values includes at least one non-zero residual value, wherein the processor is further configured to:
determine a starting position based on a distribution pattern of the at least one non-zero residual value, wherein the starting position is one of four corner positions of the residual block, and
scan the plurality of residual values starting from the starting position.

3. The apparatus of claim 2, wherein the processor is further configured to:
set a two-bit syntax element to indicate the starting position for the residual block; and
perform entropy encoding on the two-bit syntax element.

4. The apparatus of claim 3, wherein the residual block has size of N×N, wherein N is an integer greater than one, wherein a position in the residual block is denoted as (m, n), wherein m is a row index varying between 0 and N−1, wherein n is a column index varying between 0 and N−1, wherein the two-bit syntax element, denoted as (C0, C1) is configured such that:
if (C0, C1) is 00, the starting position is (0,0);
if (C0, C1) is 01, the starting position is (N−1,0);
if (C0, C1) is 10, the starting position is (0,N−1); and
if (C0, C1) is 11, the starting position is (N−1,N−1).

5. The apparatus of claim 1, wherein the prediction block is generated based on an intra prediction mode, wherein the plurality of residual values includes at least one non-zero residual value, wherein the processor is further configured to:
determine a scanning order based on the intra prediction mode; and
scan the plurality of residual values following the scanning order.

6. The apparatus of claim 5, wherein the processor is further configured to:
if the intra prediction mode is in a vertical group,
set the scanning order such that the plurality of residual values are scanned row-by-row;
otherwise if the intra prediction mode is in a horizontal group,
set the scanning order such that the plurality of residual values are scanned column-by-column.

7. The apparatus of claim 6, wherein the processor is further configured to:
generate a full significant coefficient map comprising binary symbols that indicate positions of the residual values, wherein one binary symbol of '1' indicates one position of a non-zero residual value; and
perform entropy encoding on the full significant coefficient map.

8. The apparatus of claim 1, wherein entropy encoding of the sign uses a CABAC algorithm comprising one context model.

9. The apparatus of claim 1, wherein the plurality of residual values includes at least one non-zero residual value, wherein each of the at least one residual level is between 1 and a maximum allowed value, wherein if the residual block is inverted, each inverted residual level is computed by subtracting the corresponding residual level from the maximum allowed value, wherein either a residual level or an inverted residual level is a level, wherein the processor is further configured to:
if the level is 1 or 2,
binarize the level using a truncated unary code;
if the level is greater than 2,
binarize the residual level using a combination of a truncated unary code and a fixed length code.

10. An apparatus used in video encoding comprising:
a processor configured to:
generate a prediction block for a current block;
compute a difference between the current block and the prediction block to generate a residual block, wherein the residual block comprises a plurality of residual values; and
if the plurality of residual values includes at least one non-zero residual value comprising at least one sign and at least one residual level,
perform entropy encoding on the at least one sign; and
perform entropy encoding on the at least one residual level, wherein one non-zero residual value comprises one sign and one residual level, and
wherein the plurality of residual values includes at least one non-zero residual value, wherein each of the residual levels of the current block is an integer in the range [1, 255] inclusive, wherein, if the residual block is inverted, each of inverted residual levels is computed by subtracting the corresponding residual level from 255, wherein either a residual level or an inverted residual level is a level, wherein each level is encoded according to the table:

| Level | B0 | B1 | B2 | B3 | B4 | B5 | B6 | B7 | B8 | B9 |
|-------|----|----|----|----|----|----|----|----|----|----|
| 1 | 0 | | | | | | | | | |
| 2 | 1 | 0 | | | | | | | | |
| 3 | 1 | 1 | 0 | 0 | 0 | 0 | 0 | 0 | 0 | 0 |
| 4 | 1 | 1 | 1 | 0 | 0 | 0 | 0 | 0 | 0 | 0 |
| 5 | 1 | 1 | 0 | 1 | 0 | 0 | 0 | 0 | 0 | 0 |
| ... | | | | | | | | | | |
| 255 | 1 | 1 | 0 | 0 | 1 | 1 | 1 | 1 | 1 | 1; | where "Level" denotes the value of a non-zero level, where up to ten bits are used to encode the value of a non-zero level, and where B0 to B9 represents the ten bits, wherein B0 is a least significant bit, wherein B9 is a most significant bit, wherein if Level is between [3-255],
B0 equals '1',
B1 equals '1', and
B2-B9 equals a binary representation of (Level-3).

11. The apparatus of claim 1, wherein the plurality of residual values includes at least one non-zero residual value, wherein each of the residual levels of the current block is between 1 and a maximum allowed value, wherein, if the residual block is inverted, each inverted residual level is computed by subtracting the corresponding residual level from the maximum allowed value, wherein either a residual level or an inverted residual level is a level, wherein the processor is further configured to:
  encode the at least one level, using a combination of a truncated unary code, a truncated Golomb-Rice coding algorithm, and a fixed length coding algorithm.

12. An apparatus used in video encoding comprising:
a processor configured to:
generate a prediction block for a current block;
compute a difference between the current block and the prediction block to generate a residual block, wherein the residual block comprises a plurality of residual values; and
if the plurality of residual values includes at least one non-zero residual value comprising at least one sign and at least one residual level,
perform entropy encoding on the at least one sign; and
perform entropy encoding on the at least one residual level, wherein one non-zero residual value comprises one sign and one residual level,
wherein the processor is further configured to:
set a level inversion flag for the residual block;
perform entropy encoding on the level inversion flag to generate an encoded level inversion flag;
set the level inversion flag to '1' if the residual block is inverted;
set the level inversion flag to '0' if the residual block is not inverted, wherein performing entropy encoding on the level inversion flag includes using three context models, wherein the three context models are selectable via an index equal to a sum of a second level inversion flag belonging to an upper block of the current block and a third level inversion flag belonging to a left block of the current block; and
if the upper block does not have any level inversion flag, assign a '0' to the second level inversion flag;
if the left block does not have any level inversion flag, assign a '0' to the third level inversion flag.

13. The apparatus of claim 12, wherein the level inversion flag, the second level inversion flag, and the third level inversion flag are for a luminance (luma) component.

14. The apparatus of claim 13, wherein the level inversion flag, the second level inversion flag, and the third level inversion flag are for a chrominance (chroma) component.

15. A method used in video encoding comprising:
generating a prediction block for a current block;
computing a difference between the current block and the prediction block to generate a residual block, wherein the residual block comprises a plurality of residual values; and
if the plurality of residual values includes at least one non-zero residual value comprising at least one sign and at least one residual level,
  performing entropy encoding on the at least one sign; and
  performing entropy encoding on the at least one residual level, wherein one non-zero residual value comprises one sign and one residual level,
wherein the plurality of residual values includes at least one non-zero residual value, wherein entropy encoding of a sign is based on spatial correlation between the sign and one or more previously encoded signs, and
wherein the plurality of residual values includes at least three non-zero residual values, wherein the three non-zero residual values have a first, second, and third signs, wherein performing entropy encoding on the first, second and third signs follows an encoding order, wherein the second sign immediately follows the first sign in the encoding order, wherein the third sign immediately follows the second sign in the encoding order, wherein performing entropy encoding on the third sign comprises using a context-adaptive binary arithmetic coding (CABAC) algorithm, wherein the CABAC algorithm has four context models selectable by an index, wherein the index equals
  0, if the first and second signs are (+, +);
  1, if the first and second signs are (+, −);
  2, if the first and second signs are (−, +); and
  3, if the first and second signs are (−, −).

16. The method of claim 15, wherein the plurality of residual values includes at least one non-zero residual value, the method further comprising:
  determining a starting position based on a distribution pattern of the at least one non-zero residual value, wherein the starting position is one of four corner positions of the residual block, and
  scanning the plurality of residual values starting from the starting position.

17. The method of claim 16, further comprising:
  setting a two-bit syntax element to indicate the starting position for the residual block; and
  performing entropy encoding on the two-bit syntax element.

18. The method of claim 17, wherein the residual block has size of N×N, wherein N is an integer greater than one, wherein a position in the residual block is denoted as (m, n), wherein m is a row index varying between 0 and N−1, wherein n is a column index varying between 0 and N−1, wherein the two-bit syntax element, denoted as (C0, C1) is configured such that:
  if (C0, C1) is 00, the starting position is (0,0);
  if (C0, C1) is 01, the starting position is (N−1,0);
  if (C0, C1) is 10, the starting position is (0,N−1); and
  if (C0, C1) is 11, the starting position is (N−1,N−1).

19. The method of claim 15, wherein the prediction block is generated based on an intra prediction mode, wherein the plurality of residual values includes at least one non-zero residual value, the method further comprising:
  determining a scanning order based on the intra prediction mode; and
  scanning the plurality of residual values following the scanning order.

20. The method of claim 19, the method further comprising:
  if the intra prediction mode is in a vertical group,
    setting the scanning order such that the plurality of residual values are scanned row-by-row;
  otherwise if the intra prediction mode is in a horizontal group,
    setting the scanning order such that the plurality of residual values are scanned column-by-column.

21. The method of claim 20, the method further comprising:
  generating a full significant coefficient map comprising binary symbols that indicate positions of the residual values, wherein one binary symbol of '1' indicates one position of a non-zero residual value; and
  performing entropy encoding on the full significant coefficient map; and
  bypassing entropy encoding of the last position of non-zero residual level in scanning order.

22. The method of claim 15, wherein entropy encoding of the sign uses a CABAC algorithm comprising one context model.

23. The method of claim 15, wherein the plurality of residual values includes at least one non-zero residual value, wherein each of the at least one residual level is between 1 and a maximum allowed value, wherein if the residual block is inverted, each inverted residual level is computed by subtracting the corresponding residual level from the maximum allowed value, wherein either a residual level or an inverted residual level is a level, the method further comprising:
    if the level is 1 or 2,
        binarizing the level using a truncated unary code;
    if the inverted residual level is greater than 2,
        binarizing the residual level using a combination of a truncated unary code and a fixed length code.

24. The method of claim 15, wherein the plurality of residual values includes at least one non-zero residual value, wherein each of the residual levels of the current block is an integer in the range [1, 255] inclusive, wherein, if the residual block is inverted, each of inverted residual levels is computed by subtracting the corresponding residual level from 255, wherein either a residual level or an inverted residual level is a level, wherein each level is encoded according to the table:

| Level | B0 | B1 | B2 | B3 | B4 | B5 | B6 | B7 | B8 | B9 |
|---|---|---|---|---|---|---|---|---|---|---|
| 1 | 0 | | | | | | | | | |
| 2 | 1 | 0 | | | | | | | | |
| 3 | 1 | 1 | 0 | 0 | 0 | 0 | 0 | 0 | 0 | 0 |
| 4 | 1 | 1 | 1 | 0 | 0 | 0 | 0 | 0 | 0 | 0 |
| 5 | 1 | 1 | 0 | 1 | 0 | 0 | 0 | 0 | 0 | 0 |
| ... | | | | | | | | | | |
| 255 | 1 | 1 | 0 | 0 | 1 | 1 | 1 | 1 | 1 | 1, | where "Level" denotes the value of a non-zero level, where up to ten bits are used to encode the value of a non-zero level, and where B0 to B9 represents the ten bits, wherein B0 is a least significant bit, wherein B9 is a most significant bit, wherein if Level is between [3-255],
    B0 equals '1',
    B1 equals '1', and
    B2-B9 equals a binary representation of (Level-3).

25. The method of claim 15, wherein the plurality of residual values includes at least one non-zero residual value, wherein each of the residual levels of the current block is between 1 and a maximum allowed value, wherein, if the residual block is inverted, each inverted residual level is computed by subtracting the corresponding residual level from the maximum allowed value, wherein either a residual level or an inverted residual level is a level, the method further comprising:
    encoding the at least one level, using a combination of a truncated unary code, a truncated Golomb-Rice coding algorithm, and a fixed length coding algorithm.

26. A method used in video encoding comprising:
    generating a prediction block for a current block;
    computing a difference between the current block and the prediction block to generate a residual block, wherein the residual block comprises a plurality of residual values; and
    if the plurality of residual values includes at least one non-zero residual value comprising at least one sign and at least one residual level,
    performing entropy encoding on the at least one sign;
    performing entropy encoding on the at least one residual level, wherein one non-zero residual value comprises one sign and one residual level;
    setting a level inversion flag for the residual block;
    performing entropy encoding on the level inversion flag to generate an encoded level inversion flag;
    setting the level inversion flag to '1' if the residual block is inverted;
    setting the level inversion flag to '0' if the residual block is not inverted, wherein performing entropy encoding on the level inversion flag includes using three context models, wherein the three context models are selectable via an index equal to a sum of a second level inversion flag belonging to an upper block of the current block and a third level inversion flag belonging to a left block of the current block; and
    if the upper block does not have any level inversion flag, assigning a '0' to the second level inversion flag;
    if the left block does not have any level inversion flag, assigning a '0' to the third level inversion flag.

27. The method of claim 26, wherein the level inversion flag, the second level inversion flag, and the third level inversion flag are for a luminance (luma) component.

28. The method of claim 26, wherein the level inversion flag, the second level inversion flag, and the third level inversion flag are for a chrominance (chroma) component.

29. An apparatus used in video decoding comprising:
    a processor configured to:
    receive a bitstream comprising a plurality of encoded residual blocks and a plurality of encoded level inversion flags, wherein each encoded level inversion flag corresponds to an encoded residual block;
    perform entropy decoding on the plurality of encoded residual blocks to generate a plurality of decoded residual blocks; and
    perform entropy decoding on the plurality of encoded level inversion flags to generate a plurality of decoded level inversion flags,
    wherein the encoded residual block comprises a plurality of residual values,
    wherein the plurality of residual values includes at least one non-zero residual value, wherein entropy decoding of a sign is based on spatial correlation between the sign and one or more previously decoded signs, and
    wherein the plurality of residual values includes at least three non-zero residual values, wherein the three non-zero residual values have a first, second, and third signs, wherein performing entropy decoding on the first, second and third signs follows a decoding order, wherein the second sign immediately follows the first sign in the decoding order, wherein the third sign immediately follows the second sign in the decoding order, wherein performing entropy decoding on the third sign comprises using a context-adaptive binary arithmetic coding (CABAC) algorithm, wherein the CABAC algorithm has four context models selectable by an index, wherein the index equals
    0, if the first and second signs are (+, +);
    1, if the first and second signs are (+, −);
    2, if the first and second signs are (−, +); and
    3, if the first and second signs are (−, −).

30. The apparatus of claim 29, wherein the processor is further configured to:
    for the encoded residual block,
    perform entropy decoding on the least one encoded sign to generate at least one decoded sign; and
    if a corresponding decoded level inversion flag is '1', perform a level inversion operation on the at least one encoded residual level to generate at least one inverted level, and perform entropy decoding on the at least one inverted level to generate at least one decoded inverted level, otherwise if a corresponding decoded level inversion flag is '0', perform entropy decoding on the at least one encoded residual to generate at least one decoded residual level.

31. The apparatus of claim 30, wherein an encoded residual block further comprises an encoded full significant coefficient map, wherein the processor is further configured to:

perform entropy decoding on the encoded full significant coefficient map to generate a decoded full significant coefficient map, wherein the decoded full significant coefficient map comprises at least one '1' binary symbol, wherein generating a decoded residual block includes using the decoded full significant coefficient map.

* * * * *